United States Patent [19]
Nakayama et al.

[11] 3,791,925
[45] *Feb. 12, 1974

[54] PROCESS FOR PRODUCING L-HISTIDINE

[75] Inventors: Kiyoshi Nakayama, Sagamihara; Kazumi Araki, Tokyo, both of Japan

[73] Assignee: Kyowa Hakko Kogyo Co., Ltd., Tokyo, Japan

[ * ] Notice: The portion of the term of this patent subsequent to Jan. 30, 1990, has been disclaimed.

[22] Filed: May 6, 1971

[21] Appl. No.: 141,025

[30] Foreign Application Priority Data
May 20, 1970 Japan................................ 45/42408

[52] U.S. Cl..................... 195/29, 195/28 R, 195/47
[51] Int. Cl............................................. C12b 1/00
[58] Field of Search....................... 195/28 R, 29, 47

[56] References Cited
UNITED STATES PATENTS
3,562,110 2/1971 Douros et al.................... 195/28 R
3,222,258 12/1965 Iizuka................................... 195/29
3,713,977 1/1973 Nakayama et al.................... 195/30

OTHER PUBLICATIONS

Chemical Abstracts, Vol. 74, 52162b (1971).

*Primary Examiner*—A. Louis Monacell
*Assistant Examiner*—Robert J. Warden
*Attorney, Agent, or Firm*—Fitzpatrick, Cella, Harper & Scinto

[57] ABSTRACT

L-histidine is produced by fermentation of an aqueous nutrient media, wherein the ratio of the nitrogen source to the carbon source is at least 5:100, with organisms of the genera *Brevibacterium, Corynebacterium, Arthrobacter, Micrococcus, Bacillus, Nocardia* and *Microbacterium.*

4 Claims, No Drawings

3,791,925

PROCESS FOR PRODUCING L-HISTIDINE

BACKGROUND OF THE INVENTION

The present invention relates to a process for producing L-histidine by fermentation, characterized by culturing in a nutrient media, having a nitrogen to carbon source ratio of at least 5:100, an L-histidine-producing microorganism selected from the genera, Brevibacterium, Corynebacterium, Arthrobacter, Micrococcus, Bacillus, Nocardia and Microbacterium, accumulating L-histidine in the culture liquor and recovering the L-histidine therefrom.

L-histidine is a basic amino acid which is essential in the nutrition of animals. Therefore, the establishment of a relatively inexpensive, industrial process for the production thereof has been intensively sought.

Heretofore, limited methods have been available for the production of L-histidine. For example, there is a process for the production of L-histidine by optically resolving DL-histidine prepared by a synthetic method. It has also been known to produce L-histidine by hydrolyzing proteins. These processes, however, are not commercially feasible.

As is described in our U.S. Pat. No. 3,713,977 and Japanese Patent Application No. 5389/70, there is known a process for producing L-histidine wherein certain strains of microorganisms belonging to the genera Brevibacterium, Corynebacterium, Arthrobacter, Microbacterium, Micrococcus, Nocardia, Bacillus and Azotobacter are cultured in a medium and the accumulated L-histidine is recovered therefrom. Such strains are mutants which are resistant to analogues of L-histidine. Although the above-mentioned process produces high yields of L-histidine in an industrial manner, improvements thereof are still in demand.

SUMMARY OF THE INVENTION

The present invention provides a more efficient process for producing L-histidine in high yield by fermentation. It has now been found that the concentration of the nitrogen source in the culture medium is a very important factor in the production of L-histidine. More particularly, it has been found that L-histidine is accumulated in high yield when the weight ratio of the nitrogen source in the medium to the carbon source is at least 5:100. The upper limit of the nitrogen to carbon ratio is determined by the amounts tolerated by the organism. In practice, the nitrogen to carbon ratio will be between about 5:100 and 50:100. This excess concentration of the nitrogen source is more than is usually required for the growth of microorganisms. The effect of the concentration of the nitrogen source in the medium is observed in L-histidine-producing microorganisms in general. After fermentation is complete, the L-histidine accumulated in the culture medium may be readily recovered therefrom. Thus, the present invention provides an economical commercial process for the production of L-histidine.

The organisms found useful in the present invention belong to the genera Brevibacterium, Corynebacterium, Arthrobacter, Micrococcus, Bacillus, Nocardia and Microbacterium, regardless of the taxonomical classification thereof. These organisms as disclosed in our aforementioned patent application are mutant strains of the noted genera which exhibit resistance to analogues of L-histidine (for example; α methylhistidine, 1,2,4-triazole-3-alanine, 2-thiazolealanine, 3-amino-1,2,4-triazole and hydrazinoimidazole propionic acid.

Among the strains of L-histidine-producing microorganisms belonging to the above-mentioned genera, the followings are especially preferred:
Corynebacterium glutamicum (ATCC 21604)
Corynebacterium glutamicum (ATCC 21607)
Brevibacterium ammoniagenes
Brevibacterium flavum (ATCC 21605)
Arthrobacter citreus (ATCC 21600)
Bacillus megaterium (ATCC 21603)
Nocardia globerula (ATCC 21602)
Microbacterium ammoniaphilum

DESCRIPTION

Production of L-histidine in accordance with the present invention is preferably carried out by cultivating an L-histidine-producing microorganism in an aqueous nutrient medium under aerobic conditions such as by shaking culture or by submerged culture. It is also preferred to maintain the culturing temperature between 20° and 40°C and the pH approximately neutral to obtain a high yield. However, the temperature and pH conditions may vary according to the specific microorganisms used. As to the medium composition and the culturing conditions, there are no special restrictions except that the ratio of nitrogen concentration to carbon concentration is at least 5:100. In this case, the nitrogen source in the medium is not always necessary to be the full amount at the start of the fermentation, but the remaining portion thereof may be added during the cultivation period.

The culture medium employed in the present invention may be either synthetic or natural, so long as the medium properly contains carbon sources, nitrogen sources, inorganic compounds and small amounts of additional nutrients necessary for the specific strain of microorganism used.

The carbon source may comprise various carbohydrates, for example, glucose, sucrose, molasses, starch hydrolysate solution, etc. Certain acids such as fumaric acid, acetic acid, etc., may also be used. Moreover, hydrocarbons or mixtures thereof may be employed in the nutrient medium as the main source of carbon in the case of using hydrocarbon-assimilating microorganism strain. Such hydrocarbons include straight and branched-chain paraffins (alkanes), such as n-pentane, n-octane, n-decane, n-dodecane, n-hexadecane, isopentane, isooctane, etc., cycloparaffins such as cyclohexane and cyclooctane, straight and branched-chain olefins such as pentene-2, hexene-1, octene-1, octene-2, etc., cycloolefins such as cyclohexene, aromatic hydrocarbons such as benzene, o-xylene, p-xylene, etc., and mixtures thereof and mixed hydrocarbons such as kerosene, light oils, heavy oils, paraffin oils, etc., i.e., various petroleum fractions, including petroleum crudes. The amount of the carbon source in the medium is from 1-30 percent and preferably 10-20 percent by weight per volume of the medium. As nitrogen sources, various substances such as ammonium sulfate, ammonium chloride, ammonium nitrate, urea, etc., may be used; and the amount thereof in the medium is determined by the amount of the carbon source. As inorganic materials, potassium phosphate, magnesium sulfate, calcium carbonate, manganese sulfate, etc., are used, and they are contained in the medium in all from 0.0001–10 percent by weight per volume. Furthermore, various vitamins and amino acids are also used according to the nutritional requirements of the specific strain employed.

It is preferred that the microorganism is grown in a seed medium prior to being used for inoculation of the culture medium. The seed cultivation is carried out under favorable growth conditions for a period of time sufficient to develop a suitable organism population, typically for about 24 hours. The seed culture is then inoculated into the culture medium. Fermentation is then carried out until a considerable amount of L-histidine is produced and accumulated in the resultant medium, usually for 2 to 5 days. After the completion of culturing, L-histidine is readily recovered by separating the medium from the microbial cells and subjecting the cell-free solution to an ion exchange treatment, or the like.

Practice of certain specific embodiments of the invention is illustrated by the following representative examples, in which all percentages are weight per volume percent based on medium unless indicated otherwise.

EXAMPLE I

In this example, fermentation is carried out using an L-histidine-producing mutant strain (ATCC 21604) obtained from *Corynebacterium glutamicum*. The above-mentioned microorganism is inoculated into a medium composition comprising: 15% glucose, 0.15% $KH_2PO_4$, 0.15% $K_2HPO_4$, 0.05% $MgSO_4 \cdot 7H_2O$, 0.001% $FeSO_4 \cdot 7H_2O$, 0.001% $MnSO_4 \cdot 4H_2O$ and 200 $\mu g./l.$ of biotin. A nitrogen source is added thereto and the medium is maintained at a pH of approximately 7.2. The amount of nitrogen source added, the growth of the microorganism, and the yield of L-histidine are set forth in Table 1. As indicated in Table 1, ammonium sulfate and ammonium acetate are used in separate proportions as the nitrogen source.

As shown in Table 1, when the nitrogen concentration is less than 5:100 of the carbon concentration the amount of L-histidine produced is relatively small. On the other hand, when the nitrogen-carbon ratio exceeds 5:100, the increase of the growth of the microorganism is minimal, whereas the amount of L-histidine produced is considerable.

TABLE I

| Nitrogen source (%) | Nitrogen (%) | Car-bon: | Nitrogen | Growth (OD*) | L-histidine (mg./ml.) |
|---|---|---|---|---|---|
| ammonium sulfate | | | | | |
| 0.5 | 0.11 | 100 : | 1.8 | 0.32 | Negligible |
| 1.0 | 0.21 | 100 : | 3.5 | 0.48 | 3.1 |
| 2.0 | 0.43 | 100 : | 7.2 | 0.62 | 4.9 |
| 3.0 | 0.64 | 100 : | 10.7 | 0.65 | 5.5 |
| 4.0 | 0.85 | 100 : | 14.2 | 0.65 | 6.0 |
| 5.0 | 1.05 | 100 : | 17.5 | 0.68 | 6.6 |
| 6.0 | 1.26 | 100 : | 21.0 | 0.68 | 5.8 |
| 7.0 | 1.47 | 100 : | 24.5 | 0.68 | 6.3 |
| 8.0 | 1.68 | 100 : | 28.0 | 0.65 | 5.1 |
| 9.0 | 1.89 | 100 : | 31.5 | 0.68 | 6.4 |
| 10.0 | 2.10 | 100 : | 35.0 | 0.63 | 5.4 |
| ammonium acetate | | | | | |
| 1.0 | 0.18 | 100 : | 2.9 | 0.42 | 2.5 |
| 2.0 | 0.36 | 100 : | 5.5 | 0.49 | 3.9 |
| 3.0 | 0.55 | 100 : | 7.9 | 0.49 | 4.7 |
| 4.0 | 0.73 | 100 : | 10.0 | 0.65 | 4.8 |
| 5.0 | 0.91 | 100 : | 12.0 | 0.47 | 5.3 |

(Note) *Optical Density indicated by absorbancy (using solution diluted by 50 times)

EXAMPLE II

In this example, an L-histidine-producing strain (ATCC 21604) belonging to *Corynebacterium glutamicum* is used as the seed strain. The strain is cultured with shaking at 30°C for 24 hours in a seed medium having a composition of 2 percent glucose, 1 percent peptone, 1 percent yeast extract and 0.3% NaCl. One ml. of the thus-prepared seed culture is inoculated into a 250 ml. Erlenmeyer flask containing 10 ml. of a fermentation medium comprising 15 percent glucose, 0.15% $K_2HPO_4$, 0.05% $KH_2PO_4$, 5% $(NH_4)_2SO_4$, 0.025% $MgSO_4 \cdot 7H_2O$, 0.001% $FeSO_4 \cdot 7H_2O$, 0.001% $MnSO_4 \cdot 4H_2O$, 200 $\mu g./l.$ of biotin, 2 mg./l. of thiamine hydrochloride, and 2% $CaCO_3$ (pH: 7.2). Cultivation is carried out at 30°C for 72 hours with shaking to accumulate 6.9 mg./ml. of L-histidine in the culture liquor. After the removal of microbial cells and $CACO_3$ from the culture liquor, the L-histidine in the liquor is recovered by an ion exchange treatment. Yield from one l. of the culture liquor 5.6g.

EXAMPLE III

In this example, cultivation is carried out in the same manner as in Example II, except that an L-histidine-producing straing (ATCC 21605) belonging to *Brevibacterium flavum* is used as the seed strain. The L-histidine produced is 6.4 mg./ml.

EXAMPLE IV

In this example, L-histidine-producing strains of *Brevibacterium ammoniagenes*, *Arthrobacter citreus* (ATCC 21600), *Bacillus megaterium* (ATCC 21603) and *Corynebacterium glutamicum* (ATCC 21607) are used as the seed organisms. Each of these strains is cultivated in the same manner as that of Example II. The amount of L-histidine produced in the culture liquors are given in Table II, respectively.

TABLE II

| Microorganism | L-histidine mg./ml. |
|---|---|
| *Brevibacterium ammoniagenes* | 5.9 |
| *Arthrobacter citreus* (ATCC 21600) | 3.4 |
| *Bacillus megaterium* (ATCC 21603) | 4.8 |
| *Corynebacterium glutamicum* (ATCC 21607) | 4.5 |

EXAMPLE V

In this example, the organism employed is an L-histidine-producing mutant strain (ATCC 21602) derived from *Nocardia globerula*. The strain is inoculated into a seed culture medium comprising 2 percent sorbitol, 1 percent meat extract, 1 percent peptone, 0.5 percent yeast extract, and 0.3 percent NaCl and cultured at 30°C for 24hours with shaking. One ml. of the thus-prepared seed culture is inoculated into a 250 ml. Erlenmeyer flask containing 10 ml. of a fermentation medium comprising 10% n-paraffin ($C_{11}$—$C_{13}$), 5% $(NH_4)_2SO_4$, 0.2% $K_2HPO_4$, 0.2% $KH_2PO_4$, 0.1% $MgSO_4 \cdot 7H_2O$, 0.001% $FeSO_4 \cdot 7H_2O$, 0.001% $MnSO_4 \cdot 4H_2O$, 0.001% $ZnSO_4 \cdot 7H_2O$, 5 mg./l. of thiamine hydrochloride, 0.3 percent yeast extract and 2% $CaCO_3$ (pH: 7.2). Cultivation is carried out at 30°C for 5 days with shaking. The amount of L-histidine produced in the culture liquor is 3.8 mg./ml.

What is claimed is:

1. A process for producing L-histidine by fermentation which comprises culturing an L-histidine producing microorganism which is resistant to analogues of L-histidine and belongs to the genus *Brevibacterium, Corynebacterium, Arthrobacter, Micrococcus, Bacillus, Norcordia* or *Microbacterium* in a nutrient medium, said nutrient medium having a carbon source and a nitrogen source and wherein the ratio of said nitrogen source to said carbon source is at least 5 parts of nitrogen per 100 parts of carbon, accumulating L-histidine in the culture liquor and separating and recovering said L-histidine therefrom.

2. The process according to claim 1, wherein said microorganism is an L-histidine-producing strain belonging to species *Corynebacterium glutamicum, Brevibacterium ammoniagenes, Brevibacterium flavum, Arthrobacter citreus, Bacillus megaterium, Nocardia globerula* or *Microbacterium ammoniaphilum*.

3. The process according to claim 1, wherein said microorganism is an L-histidine-producing strain selected from *Corynebacterium glutamicum* ATCC 21604, *Corynebacterium glutamicum* ATCC 21607, *Brevibacterium flavum* ATCC 21605, *Arthrobacter citreus* ATCC 21600, *Bacillus megaterium* ATCC 21603 and *Nocardia globerula* ATCC 21602.

4. The process according to claim 1, wherein the amount of said carbon source is from 1 percent to 30 percent by weight per volume of said nutrient medium, and said nutrient medium includes inorganic materials from 0.0001 percent to 10 percent by weight per volume.

* * * * *

UNITED STATES PATENT OFFICE
CERTIFICATE OF CORRECTION

Patent No. 3,791,925  Dated February 12, 1973

Inventor(s) Riyoshi Nakayama et al.

It is certified that error appears in the above-identified patent and that said Letters Patent are hereby corrected as shown below:

Column 5, line 4, "Norcordia" should read -- Nocardia --.

Signed and sealed this 21st day of May 1974.

(SEAL)
Attest:

EDWARD M.FLETCHER,JR.
Attesting Officer

C. MARSHALL DANN
Commissioner of Patents